United States Patent [19]

Goodacre et al.

[11] Patent Number: 5,061,320

[45] Date of Patent: Oct. 29, 1991

[54] SWEETENER COMPOSITION

[75] Inventors: Brita C. Goodacre, Sonning; Andrew G. Pembroke; Dipak P. Shukla, both of Reading, all of Great Britain

[73] Assignee: Tate & Lyle plc, England

[21] Appl. No.: 327,760

[22] Filed: Mar. 23, 1989

[30] Foreign Application Priority Data

Mar. 25, 1988 [GB] United Kingdom ................ 8807135

[51] Int. Cl.[5] .......................... C13F 3/00; C13F 5/00; A23L 1/236

[52] U.S. Cl. ...................................... 127/30; 426/658; 426/548

[58] Field of Search .................... 127/30, 29; 426/658, 426/548

[56] References Cited

U.S. PATENT DOCUMENTS

| | | | |
|---|---|---|---|
| 3,011,897 | 12/1961 | Grosvenor, Jr. | 426/548 |
| 3,600,222 | 8/1971 | Veltman et al. | 127/30 |
| 3,674,557 | 7/1972 | Gray, Jr. | 127/62 |
| 3,704,169 | 11/1972 | Woodruff | 127/62 |
| 3,706,599 | 12/1972 | Woodruff et al. | 127/62 |
| 3,930,048 | 12/1975 | Wookey et al. | 426/548 |
| 4,676,991 | 6/1987 | Batterman et al. | 127/30 |

FOREIGN PATENT DOCUMENTS

| | | |
|---|---|---|
| 0218570 | 4/1987 | European Pat. Off. . |
| 1191908 | 5/1970 | United Kingdom . |

OTHER PUBLICATIONS

Chemical Engineers' Handbook, Third Edition, McGraw-Hill Book Company, Inc., New York, 1950, John H. Perry, pp. 838–845.

*Primary Examiner*—Theodore Morris
*Assistant Examiner*—David M. Brunsman
*Attorney, Agent, or Firm*—Ostrolenk, Faber, Gerb & Soffen

[57] ABSTRACT

A sweetener comprises hollow spheroids or part spheroids of microcrystalline sucrose, generally bound to crystals of sucrose, and preferably containing one or more high intensity sweeteners such as sucralose. The sweetener is prepared by spray drying a sucrose syrup with simultaneous injection of an inert pressurized gas and, generally, contacting the sprayed syrup during the spray drying step and/or after completion of said step, with crystals of sucrose, and preferably by incorporating a high intensity sweetener in the syrup or in the agglomeration step.

13 Claims, 3 Drawing Sheets

1 mm

1mm

0·1mm

1mm 1 mm

SWEETENER COMPOSITION

This invention relates to low bulk density crystalline sucrose and its use as a carrier in high intensity sweetener compositions and in particular to such compositions which can replace ordinary granulated sucrose on a spoon-for-spoon basis.

Low density sweetener compositions comprise a high intensity sweetener formulated with a low-density carrier so that the product provides the same degree of sweetness volume for volume as sucrose, but with a reduced calorific value. The high intensity sweeteners of particular interest are sucralose and other halosucrose derivatives; aspartame and other dipeptide sweeteners; saccharin and acesulphame-K. Carriers for such compositions include polysaccharides such as maltodextrins and sugars such as lactose and sucrose itself. Ordinary granulated sucrose has a poured bulk density of about 0.84 g/ml. The carrier, assuming it has a similar calorific value to sucrose, must accordingly have a lower bulk density, so that a saving in calorific value can be made. For example, a maltodextrin product is described in U.S. Pat. No. 3,320,074 having a bulk density of 0.08 to 0.15 g/ml.

One disadvantage of this product is that it does not have the appearance of granulated sucrose (i.e. crystalline table sugar). A further disadvantage of very low density material is that it contains so little sugar or polysaccharide that it cannot replace sucrose in food applications where functional properties other than sweetness are required. For cooking purposes, it is important that the low density sweetener contains a significant amount of a saccharide.

An additional problem to be avoided is the possible adverse effect of the carrier substance on the quality of the sweetener. Also, reducing sugars such as lactose tend to degrade on heating, and are thus less suitable for some cooking purposes.

U.S. Pat. No. 3,011,897 and U.S. Pat. No. 3,795,746 describe processes for the production of high intensity sweetener compositions in which powdered sucrose is agglomerated in association with the high intensity sweetener. Bulk densities as low as 0.3 g/ml are described. The agglomerated type of product, however, has a very dull appearance and a lack of coherence causing it to undergo erosion to give a dusty product and a variable bulk density.

The problem is therefore to provide a carbohydrate carrier of a suitable bulk density, which is free from dust and which is not easily eroded, which has functional properties necessary for food applications and which has at least some of the visual characteristics of crystalline sugar, in particular the bright appearance or "sparkle".

A number of processes for spray drying of sucrose have been described, for example in British Patent 1,240,691, U.S. Pat. No. 3,674,557 and U.S. Pat. No. 3,615,723. The process of British Patent 1,240,691 provides powdered crystalline sucrose as a seed substance at the head of the spray drying tower. The product of such processes tends to be a relatively fine powder, typically with a particle size of about 300μ. Similarly, spray dried combinations of high intensity sweeteners and sugars are known, for example a high intensity sweetener/dextrose combination described in U.S. Pat. No. 3,930,048 having a bulk density of 0.4 g/ml. The problem with spray dried sugars in general is that the small particle size and the dull appearance of the product make it a poor substitute for granulated sucrose. Furthermore, the control of bulk density to a predetermined value is also restricted.

One way of providing a bulky low density product is by expanding a carbohydrate with a gas, especially carbon dioxide. For example, European Patent Application No. 0 218 570 describes an extrusion process in which baking powder is used to give an expanded mass of crystalline sucrose which can be milled to the desired particle size. The problem with this type of product, however, is that it contains the residues from the baking powder.

U.S. Pat. No. 3,320,074, mentioned above, is typical of a different technique for expanding the carbohydrate using carbon dioxide. Hollow spheres are formed by injecting pressurised carbon dioxide into the maltodextrin syrup being sprayed. Similarly, U.S. Pat. No. 3,746,554 provides a carbon dioxide-blown lactose product, again consisting of hollow spheres, with an overall bulk density of 0.2 g/ml. A further example of this type of product is given in U.S. Pat. No. 4,303,684 where a combination of fructose and dextrins with sucrose can be spray dried with pressurized carbon dioxide addition to give a similar product. The product tends, however, to be amorphous and has no sparkle. This type of process can only be run to produce rather low bulk densities. As explained above, if the bulk density becomes too low the sweetener product has a limited utility: it can still be used as an alternative to sucrose for sprinkling into beverages and onto cereals etc, but the very low levels of carbohydrate make it unsuitable for cooking purposes.

There is thus a need for a pure sucrose-based high intensity sweetener composition which not only has the same bulk sweetening power as sucrose, but also has sufficient carbohydrate present to provide the structural requirements for cooking purposes, while providing a bright appearance with some degree of "sparkle", yet is calorie reduced.

We have found that the spray drying technique in which the syrup is injected with pressurized carbon dioxide or other inert gases can be modified to provide a novel product possessing all the required properties.

According to the present invention we provide a sweetener comprising hollow spheroids or part spheroids of microcrystalline sucrose, especially when bound to crystals of sucrose. The sweetener may comprise sucrose alone or sucrose in intimate association with a high intensity sweetener. In one embodiment of the sweetener according to this invention, at least some of the crystals are actually located inside hollow spheroids of microcrystalline sucrose, while in an alternative embodiment at least some of the crystals are bound to the outside of the spheroids and, in particular, are agglomerated with spheroids. In both of these embodiments there is also a degree of spheroid-spheroid agglomeration. The spheroids of microcrystalline sucrose are at least 90% crystalline, e.g. at least 95% crystalline.

It will be seen that by altering the ratio of hollow spheroids to crystals, the bulk density of the product can be adjusted as required. Indeed, with the inclusion of high intensity sweetener a range of products can be obtained in which the calorie reduction is adjustable from about 8% (hollow spheroids: granulated sugar; 1:10 by volume) to 82% (hollow spheroids only), preferably from 30 to 65%, corresponding to bulk densities in the range 0.77 to 0.15 g/ml. By choosing a bulk density equivalent to a calorie reduction of about 50%, products can be obtained which can be used on a spoon-for-spoon basis interchangeably with sucrose, both as a sprinkled sweetener and also as an ingredient in baked goods and other confectionery.

The product contains no additives (other than high intensity sweetener), is not prone to erosion, the particle size distribution can be made similar to that of granulated sucrose, and the product does not have a powdery appearance. In embodiments where at least a proportion of the crystals are external to the spheroids, the product also has a distinct sparkle.

According to a further feature of this invention we provide a process for the preparation of a sweetener comprising hollow spheroids or part spheroids of microcrystalline sucrose bound to crystals of sucrose comprising spray drying of a sucrose syrup with simultaneous injection of an inert pressurised gas, and contacting the sprayed sucrose, either during the spray drying step, or after completion of said step, with crystals of sucrose.

In a particularly preferred embodiment, the spray dried product is sieved to remove most of the particles with mean aperture below 0.25 mm ("fines") and the fines are recycled. If fines are not recycled during the spray drying of the syrup to produce hollow spheroids without introduction of crystals, the product tends to collect on the walls of spray drying chamber and can cause the apparatus to become clogged.

The process may be effected in any suitable spray drying apparatus provided with an inlet for syrup and pressurised gas, provision for the recycle of fines, and where required, an inlet for crystals of sucrose. A particularly preferred apparatus is described and claimed in Dutch Patent Application No. 8900598 of Stork Friesland B. V. filed Mar. 13, 1989.

High intensity sweetener can conveniently be incorporated in the microcrystalline sucrose spheroids, by including it in the syrup which is spray-dried. However, some sweeteners are prone to degradation under the spray-drying conditions, and for these it may be preferable to coat the spheroids and crystals with the high intensity sweetener, for example by spraying them with a solution of the sweetener, or by dry mixing with the powdered sweetener so that it lodges in crevices in the surfaces of the spheroids.

To obtain the embodiment where hollow spheres actually contain crystals of sucrose, a sugar syrup can be spray-dried with injection of pressurized gas, while introducing into a spray-drying tower particulate crystalline sucrose of the required size. It is found that hollow spheres are formed, many of which surround the crystals.

Externally bound crystals of sucrose can be added to empty hollow spheroids, or to hollow spheroids containing sugar crystals, by a simple moist agglomeration process, for example using a fluidized bed. The agglomeration step is also a convenient stage at which to introduce the high intensity sweetener, especially if, as described above, it is sensitive to heat.

The size of the hollow spheres is typically within the range of from about 0.05 mm to about 1.0 mm diameter, the most common size being in the range of 0.1 to 0.5 mm. The thickness of the shell of the spheroid is approximately 10% of the radius. The product size distribution can be varied depending on the size of agglomerates which are formed and the removal of fine partides by sieving. A mean aperture of about 0.6 mm, with at least 80% product within 0.25 to 1.0 mm is typical for a product with a particle size distribution similar to that of granulated sugar.

The bulk density, and therefore the calorie reduction, of the product can readily be controlled by changing the ratio of crystals to hollow spheroids. The higher the proportion of crystals, the higher is the bulk density.

The crystalline sucrose which is incorporated in the product can conveniently comprise granulated sugar with a mean aperture value of 0.6 mm, or extra fine or caster sugar, for example with a mean aperture value of about 0.2 to 0.5 mm, typically about 0.29 to 0.34 mm for caster sugar and 0.34 to 0.42 mm for extra fine sugar. The ratio of crystals to hollow spheres, by weight, should preferably be from 1:5 to 2:1 and is most preferably about 1:2.

The bulk density is affected to a lesser degree by the agglomerate size, although larger agglomerates tend to give a lower bulk density.

Bulk density can also be affected by alteration of the thickness of the sphere wall, and the size distribution and the degree of breakage of the spheroids and by sieving to remove fine particles (which can be recycled) before or after agglomeration.

The high intensity sweetener is conveniently selected from sucralose, saccharin, a dipeptide sweetener such as aspartame, acesulfame-K, cyclamate or stevioside or a combination of two or more thereof. The amount incorporated will, of course, vary with the sweetener chosen, more intensely sweet substances being added in smaller quantities than less intensely sweet ones. In general, the intention would be to achieve a product having a bulk sweetness similar to that of crystalline sucrose, i.e. a product having the same sweetening power per unit volume as, say, granulated (table) sugar.

The following Examples illustrate the invention further.

EXAMPLE 1

Spray drying with caster sugar entrainment

Spray drying apparatus was arranged in the manner shown in FIG. 5. Carbon dioxide was mixed with the sucrose syrup, in line, under pressure. The mixture was atomised through a nozzle at the top of the spray drying tower and, concurrently, caster sugar and fines were fed in. The product was collected at the bottom of the tower in a fluidised bed for drying at between 110°-120° C. and cooling, then sieved (the fines, less than 280 microns, being recycled).

| Conditions | |
|---|---|
| Syrup brix (% solids): | 69% |
| Syrup flow rate | 360 kg/h (dry solids) |
| Nozzle pressure: | 110 bar ($1.1 \times 10^7$ Pa)gauge |
| $CO_2$: | 2.0 kg/h |
| Dry sugar: caster | 150 kg/h |
| Sieve: | 280 micron |
| Fines recycle rate: | 174 kg/h |

Operating under these conditions produced a composition consisting of caster sugar and hollow spheres in the ratio 150:360, with a poured bulk density of 0.40 g/ml and a particle size range as follows:

<0.25 mm 5%;
0.25-1.0 mm 94.5%;
>1.0 mm 0.5%.

EXAMPLE 2

Figure 1:
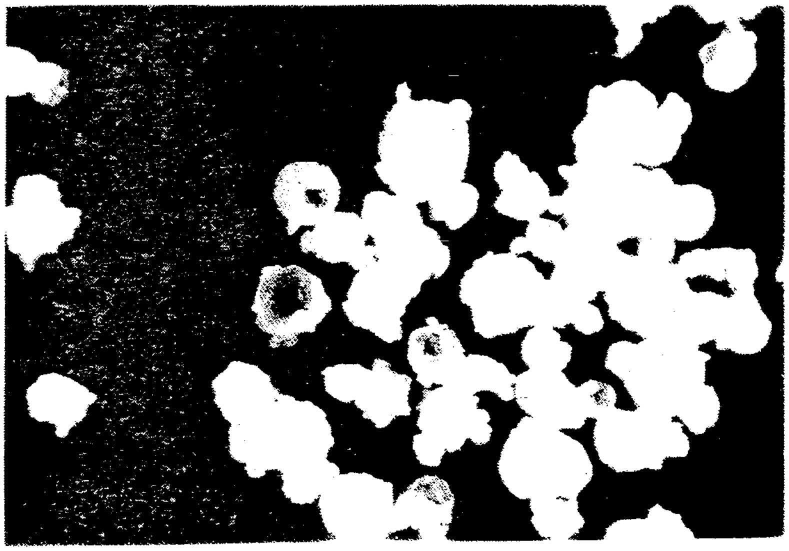
FIG. 1 is a photocopy of an electron micrograph illustrating generally the product.
Figure 2:
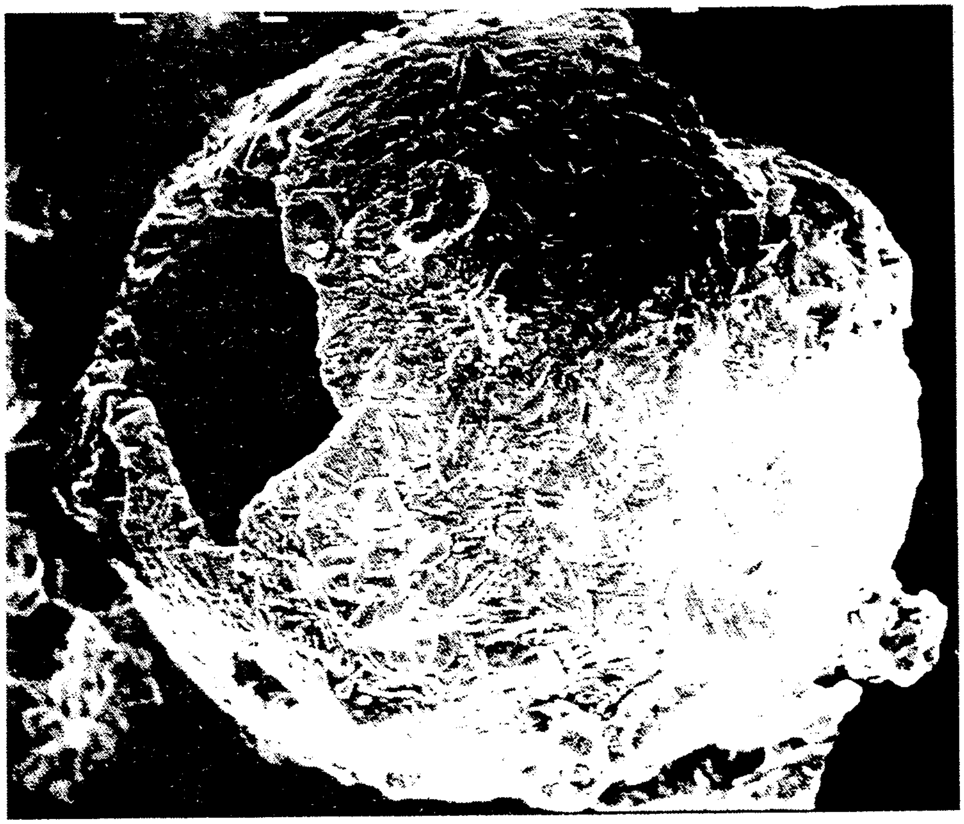
FIG. 2 is a photocopy of an electron micrograph showing the typical appearance of a single hollow sphere.
Figure 3:
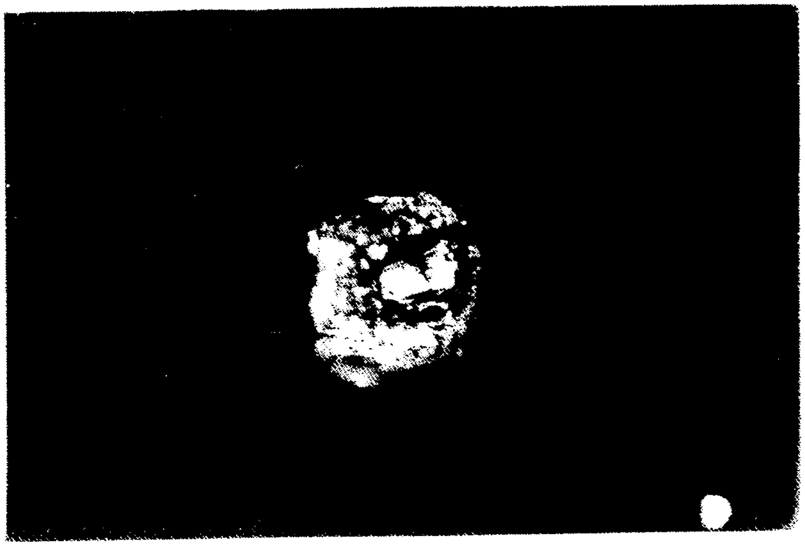
FIG. 3 is a photocopy of an electron micrograph showing a hollow sphere under polarized light, with an inclusion crystal of caster sugar.
Figure 4:
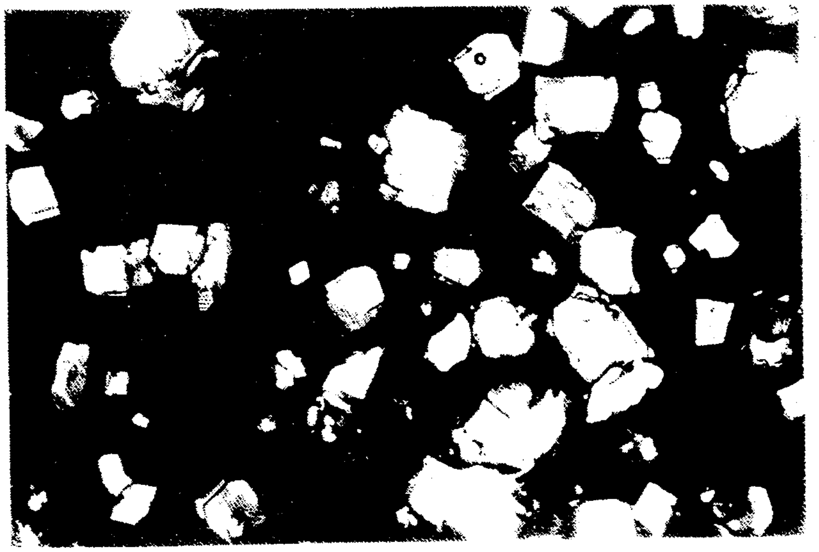
FIG. 4 is a photocopy of an electron micrograph showing the residue of crystals of caster sugar obtained on partial dissolution of the product. The degree of crystallinity of the product was obtained by determining the heat of melting. A figure of about 95% of the value for granulated sugar was obtained, thus showing that the hollow spheres were substantially crystalline.
Figure 5:
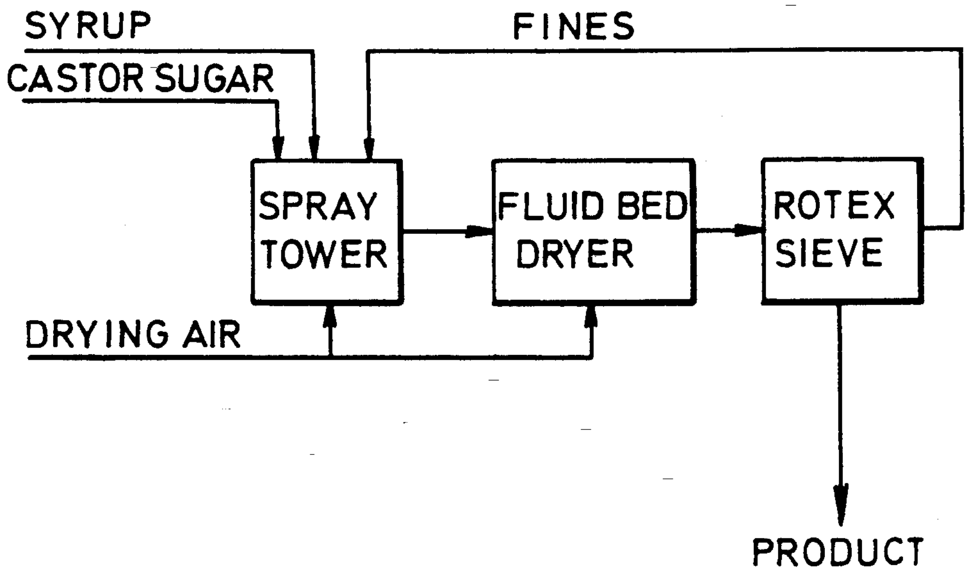
FIG. 5 shows a spray drying apparatus utilized in the invention.

Spray drying with extra fine sugar entrainment, using a sucrose syrup containing sucralose

| Conditions | |
|---|---|
| As in Example 1 except for: | |
| Syrup brix (% solids): | 68% |
| Syrup flow rate | 380 kg/h (dry solids) |
| $CO_2$ | 1.2 kg/h |
| Dry sugar: extra fine | 110 kg/h |
| Fines recycle rate: | 180 kg/h |
| Sucralose content of syrup | 0.155% dry solids |

The bulk density was 0.38 g/ml. The composition contained extra fine sugar and hollow spheres in the ratio 110:380 by weight. Sucralose at 0.12% of the total product weight was included within the walls of the hollow spheres.

EXAMPLE 3

Spray drying of sucrose with subsequent agglomeration with crystals of sucrose

| Conditions | |
|---|---|
| Syrup brix (% solids): | 66% |
| Syrup flow rate | 410 kg/h (dry solids) |
| Nozzle pressure: | 170 bar g |
| $CO_2$ | 3.6 kg/h |
| Dry sugar: | none |
| Rotex sieve: | 500 micron |
| Fines recycle rate: | 78 kg/h |

The product from the spray drying stage had a poured bulk density of 0.2 g/ml. It was agglomerated with caster sugar in a fluidized bed, using water as the agglomerating medium. The ratio of materials was 1:1 by weight. A composition consisting of caster sugar and hollow spheres in a ratio 1:1 was obtained where the bulk of the caster sugar has been agglomerated with the spheres. The facets of the caster sugar crystals were thus clearly visible and this gave a sparkling appearance to the product. The poured bulk density was 0.38 g/ml.

EXAMPLE 4

Other High Intensity sweeteners

The process of Example 2 was operated with other high intensity sweeteners under conditions predicted to give a bulk density of 0.36 g/ml for sucrose alone. It was found that aspartame plus acesulfame-K apparently affected both the bulk density and the agglomerate size distribution substantially resulting in a lower bulk density than expected. The low bulk density is consistent with the larger size of the agglomerates, but the primary cause is not known.

| Product | Bulk density g/ml | Size of agglomerates (range) >1 mm | <0.5 mm |
|---|---|---|---|
| Sucrose alone | 0.36 | 3% | 43% |
| Sucrose + 0.12% sucralose | 0.32 | 7% | 34% |
| Sucrose + 0.24% sodium saccharin | 0.34 | 8% | 33% |
| Sucrose + 0.143% aspartame + 0.19% acesulfame-K | 0.21 | 23% | 17% |
| Sucrose + 0.44% acesulfame-K | 0.36 | 6% | 37% |

EXAMPLE 5

Product Attrition Test

A product prepared by the method of Example 1 was compared with an agglomerated powder sugar composition as follows. Both products were sieved to 0.25–0.50 mm and then 200 g of each product were shaken in a 1 liter plastic container with vertical reciprocation at about one cycle per second (4 mm throw) for 30 minutes and the percentages of particles of less than 0.25 mm after the test, and the bulk densities (BD), were measured:

| | Before test | After test | |
|---|---|---|---|
| | BD g/ml | BD g/ml | % <0.25 mm |
| Present Invention | 0.43 | 0.43 | 2 |
| Agglomerated powder | 0.39 | 0 44 | 18 |

FOOD APPLICATIONS

EXAMPLE 6

Lemon souffle

Lemon souffles were made using the following ingredients and method:

Grated rind of 3 lemons
90 ml lemon juice
50 g product of Example 2 or 100 g granulated sugar
4 eggs
1×125 ml gelatine
150 ml natural set yoghurt.

Method

1. Prepare 4 ramekins with paper collar.
2. Place lemon rind, juice, sugar product and egg yolks in a bowl over hot water and whisk until thick.
3. Sprinkle gelatine onto 45 ml water and dissolve over a pan of hot water. Stir into souffle mixture and chill.

4. Fold first the yoghurt into the souffle mixture and then the stiffly whisked egg whites.
5. Pour mixture into souffle dishes and chill until set.
6. Remove the paper from the edge of the souffles.

The resulting souffles were identical to each other in volume, appearance and texture. This indicates that the product is ideal for use in gelatine desserts.

EXAMPLE 7

Meringue

Meringues were made in the following way:

| Ingredients | |
|---|---|
| 4 | eggs |
| 50 g | Product of Example 2 or 100 g (granulated) sugar |
| 1 × 5 ml | cornflour |

Method

1. Whisk egg whites until stiff.
2. Beat in half the sugar product, and all the cornflour. Fold in remaining sugar product.
3. Pipe onto rice paper, bake for 3 hours at 100° C.

The resulting meringues were indistinguishable from each other, both having a crisp, light open texture. The major difference was that the meringues according to the invention have about half the calories of the sugar standard without losing any of the meringue characteristics.

EXAMPLE 8

Calorie-reduced cookies

The following oat and nut cookies represent a unique product that cannot be reproduced using granulated sugar because if the sweetness level is correct the texture will be too heavy, and if the texture is correct the cookie will be undersweetened.

| Ingredients | |
|---|---|
| 40 g | Golden syrup |
| 125 g | margarine |
| 50 g | product of Example 2 |
| 75 g | rolled oats |
| 50 g | chopped nuts |
| 100 g | wholemeal flour |
| 2 × 5 ml | bicarbonate of soda |

Method

1. Place the sugar product, margarine and syrup in saucepan to dissolve.
2. Mix together dry ingredients.
3. Mix to soft dough with melted ingredients.
4. Divide into 30 portions, roll into balls and place well apart on greased tray.
5. Bake at 170° C. for 15 minutes. Remove and cool on cooling trays.

Makes 30 biscuits.

These biscuits are a light crisp product that cannot be exactly re-created using ordinary granulated sugar. A product made with 100 g of granulated sugar in place of 50 g of the product of Example 2 was heavy and hard.

EXAMPLE 9

Sweetener Containing Aspartame

A sucrose syrup was spray dried as in Example 3 to provide a product with a bulk density of 0.2 g/ml (500 g). This product was agglomerated with a mixture of caster sugar (500 g) and aspartame (5 g) in a fluidised bed, using water as the agglomerating medium. The dried agglomerated product had a poured bulk density of 0.36 g/cm$^3$.

EXAMPLE 10

Low density sweetener compositions containing granulated sugar and high intensity sweeteners A sucrose syrup was spray dried as described in Example 3 to provide a product comprising hollow spheroids of microcrystalline sucrose, with a bulk density of 0.2 g/ml. This product was agglomerated with granulated sugar and various high intensity sweeteners in the following proportions, in fluidised bed, using water as the agglomerating medium.

| | Percentage of component (by weight) in product | | | | | | |
|---|---|---|---|---|---|---|---|
| Component | (a) | (b) | (c) | (d) | (e) | (f) | (g) |
| Hollow spheroids | 31.9 | 31.75 | 31.75 | 31.83 | 31.75 | 31.56 | 31.16 |
| Granulated sugar | 68 | 68 | 68 | 68 | 68 | 68 | 68 |
| Sucralose | 0.1 | — | — | — | — | — | 0.04 |
| Aspartame | — | 0.25 | — | — | — | — | — |
| Acesulfame-K | — | — | 0.25 | — | — | — | — |
| Saccharin | — | — | — | 0.17 | — | 0.04 | — |
| Stevioside | — | — | — | — | 0.25 | — | — |
| Cyclamate | — | — | — | — | — | 0.4 | 0.8 |

Each of the products (a) to (g) had approximately the same sweetness as the same volume of granulated sugar, half of the sweetness being provided by the sugar and half by the high intensity sweetener. All of the products had a distinct sparkle.

EXAMPLE 11

Spray drying of sucrose without introduction of crystals

The procedures of Example 3 were followed, varying the syrup Brix from 64% to 69%, the syrup flow rate from 350 to 420 Kg/h; carbon dioxide from 2.2 to 3.6 kg/h; and nozzle pressure from 120 to 180 g.

The results were rather variable, but there was a trend towards low bulk density when low syrup Brix was combined with high $CO_2$ and high nozzle pressure. Bulk densities ranged from 0.15 to 0.25 g/ml.

We claim:

1. A sweetener comprising hollow spheroids or part spheroids of microcrystalline sucrose.

2. The sweetener according to claim 1, in which the spheroids or part spheroids are bound to crystals of sucrose.

3. The sweetener according to claim 2, in which at least some of the crystals are located inside hollow spheroids.

4. The sweetener according to claim 2, in which at least some of the crystals are bound to the outside of the spheroids.

5. The sweetener according to claim 1 containing no bound crystals of sucrose and having a bulk density of from 0.2 to 0.15 g/ml.

6. The sweetener according to claim 2 having a bulk density of from 0.77 to 0.25 g/ml.

7. The sweetener according to claim 1, in which the size of the hollow spheres is within the range from about 0.05 mm to about 1.0 mm diameter.

8. The sweetener according to claim 7, in which the size of the hollow spheres is within the range of 0.1 mm to 0.5 mm.

9. The sweetener according to claim 2, in which the sucrose crystals are of a size such that they possess a mean aperture value of about 0.2 mm to about 0.5 mm.

10. The sweetener according to claim 2, in which the ratio of crystals to hollow spheres, by weight, is from 1:5 to 2:1.

11. The sweetener according to claim 1 containing one or more high intensity sweeteners intimately associated with the sucrose.

12. The sweetener according to claim 11, in which the high intensity sweetener comprises sucralose, saccharin, a dipeptide sweetener, acesulfame-K, cyclamate, stevioside or a combination of two or more thereof.

13. The sweetener according to claim 11 containing sufficient high intensity sweetener to have a bulk sweetness similar to that of crystalline sucrose.

* * * * *